United States Patent
Seo et al.

(10) Patent No.: US 12,533,067 B2
(45) Date of Patent: Jan. 27, 2026

(54) IN VIVO INSERTABLE ELECTRODE AND METHOD OF MANUFACTURING THE SAME

(71) Applicants: UIF (University Industry Foundation), Yonsei University, Seoul (KR); KOREA INSTITUTE OF SCIENCE AND TECHNOLOGY, Seoul (KR)

(72) Inventors: Jungmok Seo, Seoul (KR); Yeontaek Lee, Seongnam-si (KR); Il-Joo Cho, Seoul (KR); Hyogeun Shin, Seoul (KR)

(73) Assignees: UIF (UNIVERSITY INDUSTRY FOUNDATION), YONSEI UNIVERSITY, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 958 days.

(21) Appl. No.: 17/721,981

(22) Filed: Apr. 15, 2022

(65) Prior Publication Data
US 2022/0330871 A1    Oct. 20, 2022

(30) Foreign Application Priority Data

Apr. 15, 2021 (KR) .................. 10-2021-0049112

(51) Int. Cl.
*A61B 5/251*    (2021.01)
*A61B 5/263*    (2021.01)
(Continued)

(52) U.S. Cl.
CPC .............. *A61B 5/251* (2021.01); *A61B 5/263* (2021.01); *C25D 3/50* (2013.01); *C25D 5/48* (2013.01); *C25D 7/00* (2013.01)

(58) Field of Classification Search
CPC ... A61B 5/263; A61B 5/293; A61B 2562/125; A61N 1/0529
See application file for complete search history.

(56) References Cited

U.S. PATENT DOCUMENTS 11,040,190 B2 *    6/2021    Bachinski .............. A61B 5/268
2011/0257702 A1    10/2011    Kara et al.
(Continued)

FOREIGN PATENT DOCUMENTS

KR    10-1566342 B1    11/2015
KR    10-2020-0119153 A    10/2020

OTHER PUBLICATIONS

Chuan Zhang et al., "Implantable electrode array with platinum black coating for brain stimulation in fish", Microsystem Technologies, Dec. 12, 2013, pp. 139-145.

*Primary Examiner* — Linda C Dvorak
*Assistant Examiner* — Christine A Dedoulis
(74) *Attorney, Agent, or Firm* — Paratus Law Group, PLLC

(57) ABSTRACT

The present invention relates to an electrode, which is an in vivo insertable electrode, including a substrate, an electrically conductive layer formed on the substrate, a platinum black layer formed on the electrically conductive layer, a self-assembled monolayer (SAM) formed on the platinum black layer, and a lubricant layer formed on the SAM, a method of manufacturing the electrode, and a medical device including the electrode. The in vivo insertable electrode according to the present invention provides excellent electrical properties such as low impedance. Further, it shows that friction with tissue occurring when the electrode is inserted is reduced, and trauma during insertion and an immune rejection response after insertion is suppressed. Further, in the long term, it is possible to detect signals with high sensitivity throughout the entire period by preventing bioadhesion of in vivo cells, such as immune cells, and other proteins.

3 Claims, 9 Drawing Sheets

(51) Int. Cl.
*C25D 3/50* (2006.01)
*C25D 5/48* (2006.01)
*C25D 7/00* (2006.01)

(56) References Cited

U.S. PATENT DOCUMENTS

2013/0282000 A1* 10/2013 Parsonage ............... A61B 18/18
 606/33
2015/0366508 A1* 12/2015 Chou .................... A61N 1/056
 600/467

* cited by examiner

A Operating mechanism

B

ELECTRODE SURFACE EXTRACTED FROM MOUSE BRAIN AFTER 16 WEEKS

CONTROL GROUP   EXPERIMENTAL GROUP

IN VIVO INSERTABLE ELECTRODE AND METHOD OF MANUFACTURING THE SAME

CROSS-REFERENCE TO RELATED APPLICATION

This application claims priority to and the benefit of Korean Patent Application No. 10-2021-0049112, filed on Apr. 15, 2021, the disclosure of which is incorporated herein by reference in its entirety.

BACKGROUND

The present invention relates to an in vivo insertable electrode and a method of manufacturing the same.

Human body insertable (or implantable) medical devices are medical devices that are inserted into the human body to substitute for a part of the body's function, deliver electrical stimulation, or inject medicine. Such human body insertable medical devices include, for example, nerve electrodes that are used for rehabilitation and treatment through measurement of biological nerve signals and stimulation of nerve cells for spinal injury patients, optic nerve injury patients, mentally ill patients, etc.

However, medical devices such as electrodes have relatively high mechanical strength compared to nerve tissue. Therefore, when the electrodes are inserted into the human body, there is a limit to long-term detection of electrical signals due to a problem in that acute trauma, such as a wound, is caused by friction with tissue, a nerve electrode is blocked from tissue due to an inflammatory reaction or an immune rejection response, or immunocytes, blood cells, or other proteins are bio-adhered to the electrode. Accordingly, there is a need to develop a technique in which acute trauma and an immune rejection response that are caused by the insertion of the medical device into the human body can be suppressed and bioadhesion of cells and the like in tissue can be prevented.

In addition, medical devices such as nerve electrodes require electrical energy to deliver electrical stimulation to tissue, and thus consumption of such electrical energy affects the effectiveness and performance of the medical devices. In particular, when impedance is low, energy consumption can be reduced and high-quality neural signals can be obtained. However, when the medical device is coated to prevent bioadhesion, disadvantages such as an increase in impedance due to such a coating layer and the like may occur.

SUMMARY

The present invention is directed to providing an in vivo insertable electrode in which trauma and an immune rejection response that are caused by in vivo insertion can be suppressed while excellent electrical properties such as low impedance and the like are exhibited, and bioadhesion of cells and the like in tissue can be prevented.

The present invention is also directed to providing a method of manufacturing the in vivo insertable electrode as described above.

The present invention is also directed to providing a medical device including the in vivo insertable electrode as described above.

According to an aspect of the present invention, there is provided an electrode, which is an in vivo insertable electrode, including a substrate, an electrically conductive layer formed on the substrate, a platinum black layer formed on the electrically conductive layer, a self-assembled monolayer (SAM) formed on the platinum black layer, and a lubricant layer formed on the SAM.

According to another aspect of the present invention, there is provided a method of manufacturing an in vivo insertable electrode, including a step (a) of forming a platinum black layer on an electrically conductive layer, a step (b) of forming a self-assembled monolayer on the platinum black layer, and a step (c) of forming a lubricant layer on the self-assembled monolayer.

According to still another aspect of the present invention, there is provided a medical device including the in vivo insertable electrode as described above.

DETAILED DESCRIPTION

Figure 1:
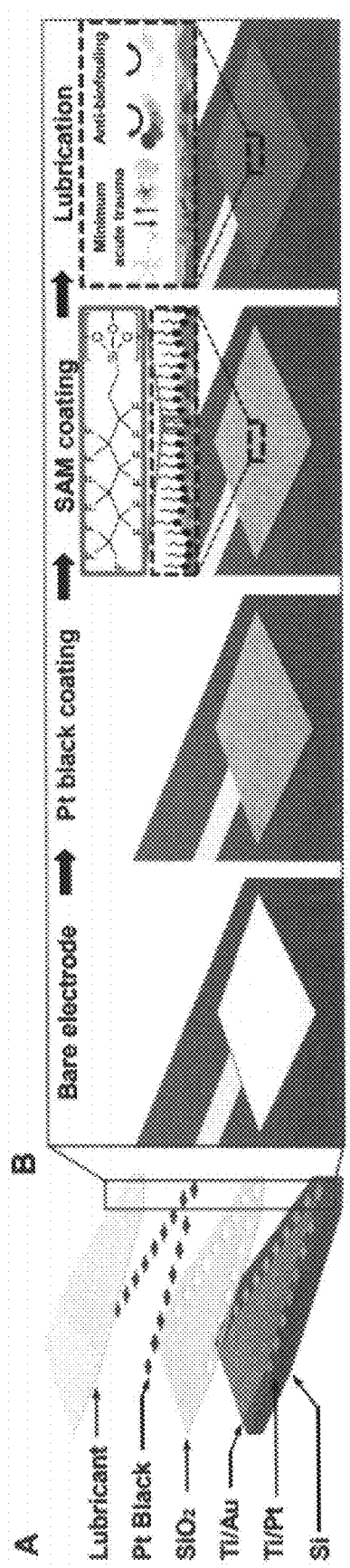
FIG. 1 exemplarily and schematically shows a method of manufacturing an electrode according to an embodiment of the present invention.

Hereinafter, the present invention will be described in detail.

The terminology used herein is for the purpose of describing particular embodiments only and is not intended to limit the present invention. Unless otherwise defined, all terms including technical and scientific terms used herein have the same meaning as commonly understood by one of ordinary skill in the art to which the present invention belongs.

Throughout this specification, when a part "includes," "contains," or "has" a certain element, it means that other elements may be further included unless defined otherwise.

Further, in the description with reference to the accompanying drawings, the same elements are denoted by the same reference numerals, and descriptions thereof will not be repeated. In the drawings, for example, the size and shape of members may be exaggerated for convenience and clarity of description, and in actual implementation, variations of the illustrated shape may be expected. Therefore, embodiments of the present invention should not be construed as limited to the specific shapes of the regions illustrated herein.

It should be understood that the terms "first," "second," and the like may be used to distinguish one element from other elements, the elements are not limited by the terms.

When a part such as a layer, film, or the like is referred to as being "formed above" or "formed on" another part, it includes a case in which the part is formed directly on another part so that the part and another part are in contact with each other and a case in which a still another part is interposed between the part and another part. In contrast, when a part is referred to as being "formed directly above" or "formed directly on" another part, it means that there is no other part therebetween.

According to an aspect of the present invention, an electrode, which is an in vivo insertable electrode, including a substrate, an electrically conductive layer formed on the substrate, a platinum black layer formed on the electrically conductive layer, a self-assembled monolayer (SAM) formed on the platinum black layer, and a lubricant layer formed on the SAM, is provided.

The substrate may include glass ($SiO_2$), silicon (Si), plastic, or the like, and specifically, may be a flexible substrate. Examples of the flexible substrate may include polycarbonate (PC), polyethylene terephthalate (PET), polyethylene naphthalate (PEN), polydimethylsiloxane (PDMS), ecoflex, and polyimide (PI).

The electrically conductive layer may receive or transmit a signal from or to living body tissue or provide electrical stimulation to living body tissue. The electrically conductive layer may include an electrically conductive metal, and specifically, may include one alloy or two or more alloys selected from the group consisting of gold (Au), silver (Ag), platinum (Pt), copper (Cu), titanium (Ti), tungsten (W), and molybdenum (Mo). Further, the electrically conductive layer may have a two-layer structure in which a first metal layer and a second metal layer formed of different materials are stacked, and may be formed, for example, by depositing a metal such as Ti as a first metal layer to improve adhesion to the substrate, and depositing the above-described electrically conductive metal as a second metal layer thereon. The electrically conductive layer may be patterned using a photoresist after the deposition. The electrically conductive layer may include a metal wiring and a metal tip. Here, the metal wiring and the metal tip may be made of the same material or different materials. For example, the metal wiring may be a Ti/Au layer and the metal tip may be a Ti/Pt layer. An insulating layer such as $SiO_2$ may be additionally formed on the metal wiring of the electrically conductive layer, and conversely, an insulating layer may not be formed on the metal tip. Accordingly, the metal wiring may serve to transmit an electrical signal between a medical device and the metal tip without being exposed toward the living body tissue, and the metal tip may be exposed toward the living body tissue to receive a signal from the living body tissue, provide electrical stimulation, or the like.

The platinum black layer is formed on the electrically conductive layer (or the metal tip of the electrically conductive layer). The platinum black is a fine powder of platinum having excellent catalytic properties, and is named platinum black because it is black. The platinum black layer may be formed by electroplating.

The SAM may include at least one selected from the group consisting of alkyltrichlorosilane, alkyltrimethoxysilane, alkyltriethoxysilane, polytetrafluoroethylene (PTFE), perfluoroalkoxy alkane (PFA), dichlorodimethylsilane (DDMS), perfluorodecyltrichlorosilane (FDTS), octadecyltrimethoxysilane (OTMS), trichloro (1H,1H,2H,2H-perfluorooctyl)silane (FOTS), and triethoxy (1H,1H,2H,2H-perfluoro-1-octyl)silane (POTS).

The lubricant layer is formed of a material for preventing friction with tissue when the electrode is inserted in the living body and preventing adhesion of biomaterials present in the tissue, and the material may include at least one selected from the group consisting of perfluoroperhydrophenanthrene, perfluorodecalin, and perfluoropolyether (PFPE). Examples of the PFPE may include what is called Krytox-100.

According to another aspect of the present invention, a method of manufacturing an in vivo insertable electrode, including a step (a) of forming a platinum black layer on an electrically conductive layer, a step (b) of forming a SAM on the platinum black layer, and a step (c) of forming a lubricant layer on the SAM, is provided.

According to an embodiment of the present invention, the method of manufacturing the in vivo insertable electrode may further include, before step (a) is performed, a step (a-1) of depositing an electrically conductive material on a substrate and patterning the electrically conductive material to form an electrically conductive layer. Specifically, a metal wiring may be formed by depositing a first electrically conductive material on the substrate and patterning the first electrically conductive material, and then, a metal tip may be formed by depositing a second electrically conductive material and patterning the second electrically conductive material. Here, the metal wiring and the metal tip may constitute the electrically conductive layer. The patterning may be performed by a conventional photolithography, electron beam lithography, or lift-off technique. Further, specifically, each of the first electrically conductive material and the second electrically conductive material may include one alloy or two or more alloys selected from the group consisting of gold (Au), silver (Ag), platinum (Pt), copper (Cu), titanium (Ti), tungsten (W), and molybdenum (Mo). The first electrically conductive material and the second electrically conductive material may be the same or different. For example, the first electrically conductive material for forming the metal wiring may form a Ti/Au layer, and the second electrically conductive material for forming the metal tip may form a Ti/Pt layer.

Further, according to another embodiment of the present invention, the method of manufacturing the in vivo insertable electrode may further include, before step (a) is performed, a step (a-2) of forming an insulating layer on a part of the electrically conductive layer. The insulating layer is formed to prevent a part of the electrically conductive layer from being exposed toward and brought into contact with living body tissue. Therefore, the insulating layer is formed on a part of the electrically conductive layer, and specifically, on the metal wiring. The electrically conductive layer on which the insulating layer is formed, specifically, the metal wiring, is positioned in the electrode without being exposed toward the living body tissue, and may serve to transmit a signal received from the metal tip exposed toward the living body tissue or a signal transmitted to the metal tip without the influence of external noise.

Step (a) is a step of forming the platinum black layer on the electrically conductive layer, and may be performed by electroplating. To perform the electroplating, specifically, an electroplating solution in which a platinum precursor capable of forming platinum black particles is dissolved in a solvent is prepared, the electrode is immersed in the electroplating solution, and then a voltage should be applied thereto. Here, as the platinum precursor, platinum chloride, potassium tetrachloroplatinate, tetraamineplatinum chloride, chloroplatinic acid hydrate, and the like may be used. The electroplating solution may further contain lead acetate in addition to the platinum precursor and the solvent. A thickness of the platinum black layer may be controlled according to a voltage supply time, and specifically, the electroplating may be performed for 1 second to 60 seconds. The electroplating may be performed by a two-electrode system consisting of a reference electrode and a working electrode or may be performed by a three-electrode system consisting of a reference electrode, a counter electrode, and a working electrode. The electrode according to the present invention may be used as the working electrode in the two-electrode system or three-electrode system, and thus the platinum black layer may be formed by electroplating.

According to an embodiment of the present invention, the method of the present invention may further include, before the SAM is formed in step (b), a step of performing surface treatment on the platinum black layer. The step of performing the surface treatment is a step of performing plasma treatment on the platinum black layer with $N_2O$ or $O_2$. Here, the plasma treatment may be performed under normal pressure. Through the plasma surface treatment, hydroxyl end groups (—OH groups) may be formed on the platinum black layer. Among self-assembled monolayers, a self-assembled monolayer in which a head group portion has a trichlorosilane group, for example, FDTS and FOTS, may form a covalent bond with a hydroxyl group, and thus the bonding with a subsequent SAM can be improved due to the surface treatment.

Step (b) is a step of forming the SAM on the platinum black layer. This step may be performed by any of a liquid phase method and a gas phase method. The liquid phase method may be performed by immersing the electrode on which the platinum black layer is formed in an organic solution containing monomolecules for forming a SAM. Further, the gas phase method may be performed by depositing self-assembled monomolecules on the platinum black layer, and the deposition may be performed in a vacuum chamber, for example, in a vacuum chamber under a pressure of 0.8 Torr to 1.2 Torr. Accordingly, according to an embodiment of the present invention, step (b) may be performed by depositing a solution containing monomolecules for forming a SAM in the vacuum chamber under a pressure of 0.8 Torr to 1.2 Torr.

Step (c) is a step of forming the lubricant layer on the SAM. As the lubricant, liquids with excellent biocompatibility may be used according to viscosity and density values. Examples of the lubricant may include perfluoroperhydrophenanthrene, perfluorodecalin, and PFPE. Step (c) may be performed by immersing the electrode on which the SAM is formed into a lubricant solution for forming the lubricant layer. The lubricant may wet a surface of the electrode and keep surface energy low, and thus the lubricant may cause microorganisms such as bacteria and the like to slide on the surface without being attached to the surface. This step may be performed by immersing the electrode on which the SAM is formed in the lubricant solution.

According to still another aspect of the present invention, a medical device including the in vivo insertable electrode as described above is provided. The medical device may be implanted into the human body to substitute for a part of the body's function, or may be inserted into the human body to deliver electrical stimulation. In contrast, the medical device is not necessarily limited to transmitting an electrical signal, and may be a medical device that is inserted into the human body to inject medicine.

Hereinafter, the present invention will be described in more detail with reference to examples in order to help with understanding of the present invention. However, the following examples are only provided for easier understanding of the present invention, and the contents of the present invention are not limited by the following examples.

[Example] Manufacturing of Electrode According to the Present Invention

Figure 2:
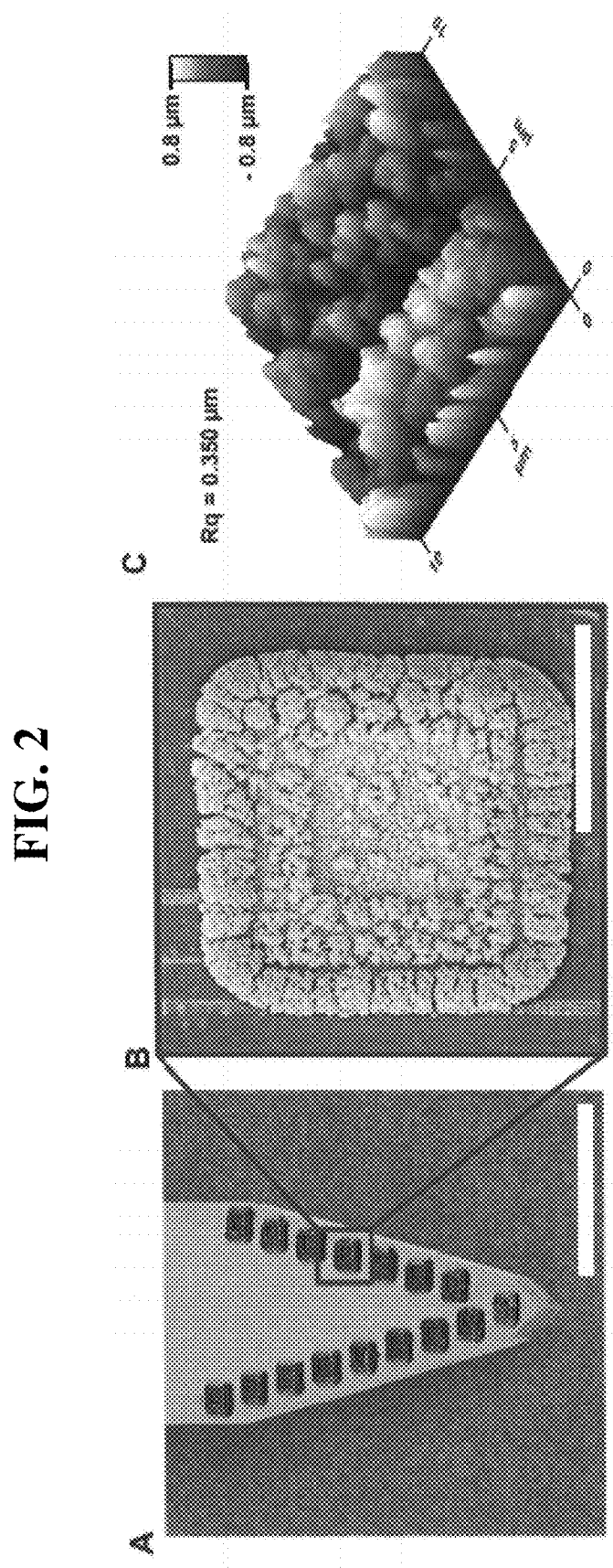
FIG. 2 shows a scanning electron microscope (SEM) image (see FIG. 2, A) of an electrode manufactured in step (1) of Example, an SEM image (see FIG. 2, B) showing an enlarged Pt black layer on the manufactured electrode, and a morphology (see FIG. 2, C) of the Pt black layer.

Platinum black (Pt black) was electroplated on a Pt electrode of a neural probe for recording a nerve signal as follows. A platinum black (Pt black) electroplating solution was prepared by mixing hexachloroplatinic acid hydrate (HCPA), 0.025 N HCl, and 0.025% lead acetate in deionized water. Next, a nerve electrode, together with a platinum wire (reference electrode) and an Ag/AgCl wire (counter electrode), was immersed in the electroplating solution. By applying a potential of 0.2 V through a potentiostat (PalmSens3, PalmSens, Netherlands) for 35 seconds, platinum particles in the platinum black electroplating solution were plated on the platinum electrode. A scanning electron microscope (SEM) image of the electrode manufactured in this way is shown in FIG. 2, A. FIG. 2, B is an SEM image showing an enlarged platinum black (Pt black) layer on the manufactured electrode, and FIG. 2, C shows a morphology of the Pt black layer.

The probe made in this way was subjected to plasma treatment under ambient oxygen (100 W, 5 min) to perform surface treatment thereon so that hydroxyl end groups (—OH groups) were formed, and then was immediately transferred to a multi-valve vacuum chamber (1 Torr). A glass vial containing 200 μL of FOTS (Sigma-Aldrich, Germany) was placed in another vacuum chamber (1 Torr) previously degassed, and was connected to the multi-valve chamber containing the probe and maintained at 60° C. for 30 minutes. Thereafter, a valve for supplying FOTS vapor was closed, and the multi-valve chamber was connected to another chamber filled with vaporized deionized water to supply water vapor. After 30 minutes, the chamber was isolated and degassed to 1 Torr, and this process was repeated twice so that all pin holes in the SAM were covered. Next, the probe on which the FOTS SAM was formed was washed with isopropyl alcohol (IPA) and deionized water to remove excess FOTS. A PFPE lubricant (Krytox 101, miscible with most non-polar and polar liquids; chemically stable; DuPont, USA) was filtered through a 0.2 μm filter, and then the probe was immersed in the lubricant to form a lubricant layer. Excess lubricant was removed by tilting the probe at 90° for 24 hours, and then the probe was used immediately for surgery.

[Evaluation Example 1] Impedance Measurement

Figure 3:
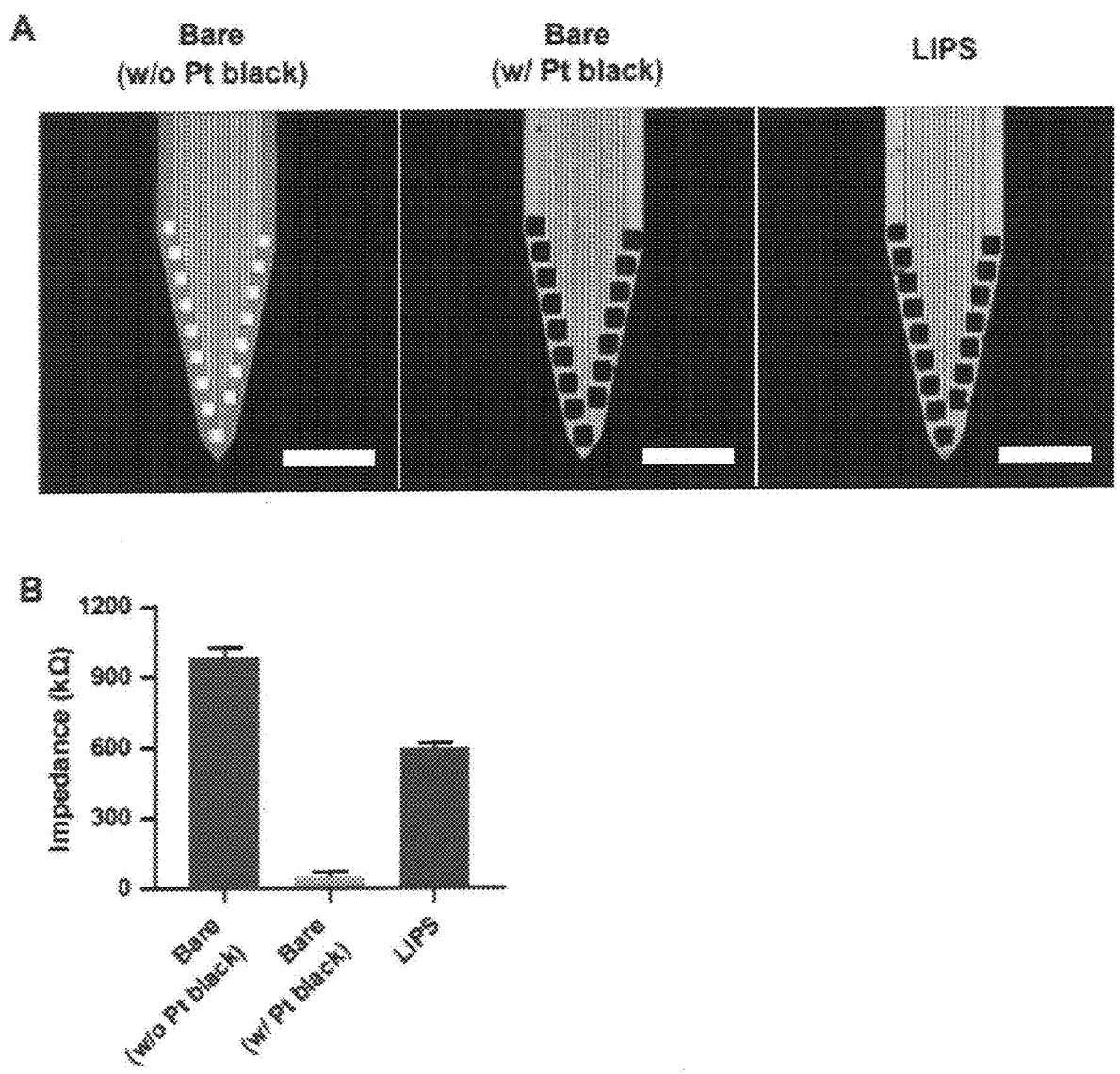
FIG. 3 shows images (see FIG. 3, A) of three types of electrodes described in Evaluation Example 1, and a graph (see FIG. 3, B) showing impedance values measured for these three types of electrodes.

An image of a bare electrode (hereinafter, also indicated as "Bare (w/o Pt black)") manufactured in the same manner in the above Example except that a Pt black layer, a SAM, and a lubricant layer were not formed, an image of a bare electrode (hereinafter, also indicated as "Bare (w/Pt black)") manufactured in the same manner in the above Example except that only a Pt black layer was formed and a SAM and a lubricant layer were not formed, and an image of an electrode (hereinafter, also indicated as "LIPS") according to the present invention in which all of a Pt black layer, a SAM, and a lubricant layer were formed according to the above embodiment are shown in FIG. 3, A. Impedance was measured for these three types of electrodes, and results of the measurement are shown in FIG. 3, B. It can be seen from FIG. 3, B that the impedance value can be reduced when Pt black is used.

[Evaluation Example 2] Anti-Bioadhesion Effect

Figure 4:
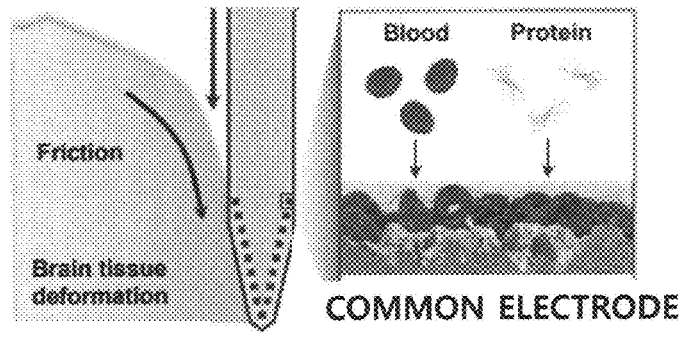
FIG. 4 shows adhesion mechanisms (see FIG. 4, A) of blood and proteins in vivo in a control group in which a self-assembled monolayer (SAM) and a lubricant layer are not formed and in an experimental group in an embodiment according to the present invention in which both a SAM and a lubricant layer are formed, and images (see FIG. 4, B) of surface states of electrodes extracted 16 weeks after the electrode in the control group and the electrode in the experimental group are inserted into a mouse's brain.
Figure 4:
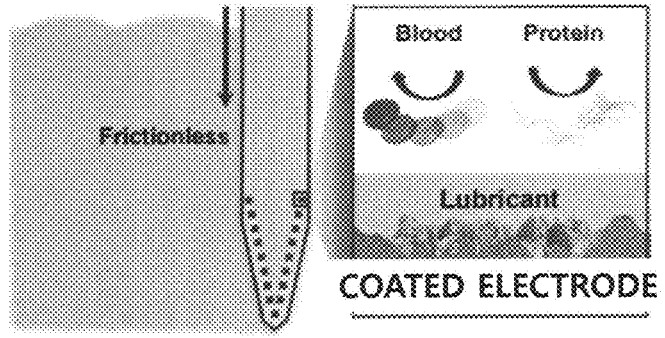
Figure 4:
Figure 4:

By using a control group in which a SAM and a lubricant layer were not formed and an experimental group in which both a SAM and a lubricant layer were formed in Example of the present invention, adhesion mechanisms of in vivo blood and proteins in these control and experimental groups and surface state images of electrodes extracted 16 weeks after each of the electrodes in these control and experimental groups was inserted into a mouse's brain are shown in FIG. 4. It can be confirmed from FIG. 4 that by forming the SAM and the lubricant layer according to the present invention, in vivo bioadhesion can be prevented, and accordingly, 16 weeks after the electrode is inserted into the mouse's brain, contamination occurred in the control group but no contamination occurred in the experimental group.

Figure 5:
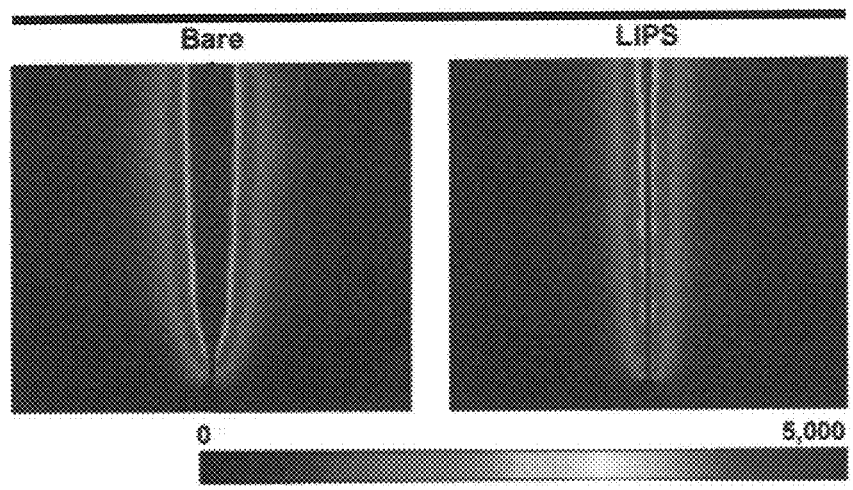
FIG. 5 shows degrees (see FIG. 5, A) of brain damage caused by an external force that occurs when a bare electrode (control group) and a lithium polysulfide (LiPS) electrode (the present invention) are inserted into a mouse's brain, and degrees (see FIG. 5, B) of brain damage caused by micro motion.
Figure 5:
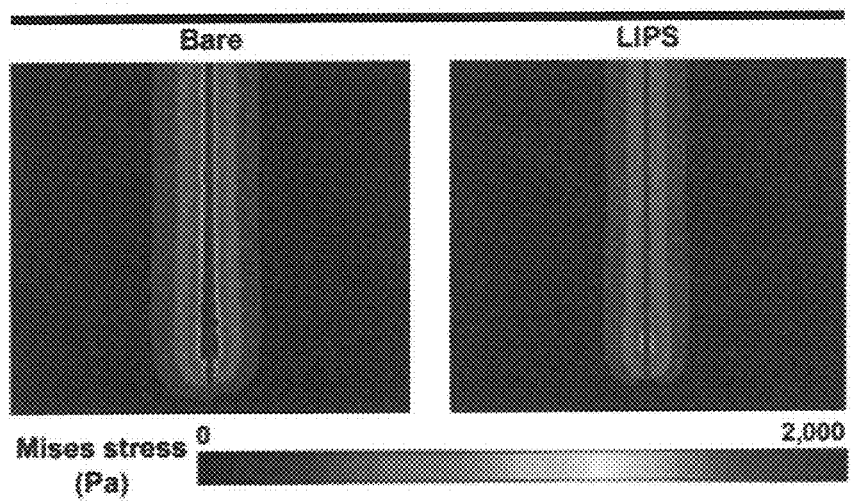

[Evaluation Example 3] Trauma Caused by an External Force or Micro Motion During Electrode Insertion Each of a bare electrode (control group) and an LiPS electrode (the present invention) was inserted into a mouse's brain, and a degree of brain damage caused by an external force generated at this time and a degree of brain damage caused by micro motion after insertion were compared by simulation, and results of the comparison are shown in FIG. 5. It can be confirmed from FIG. 5 that a degree of trauma was significantly reduced when the LiPS electrode according to the present invention was used.

Figure 6:
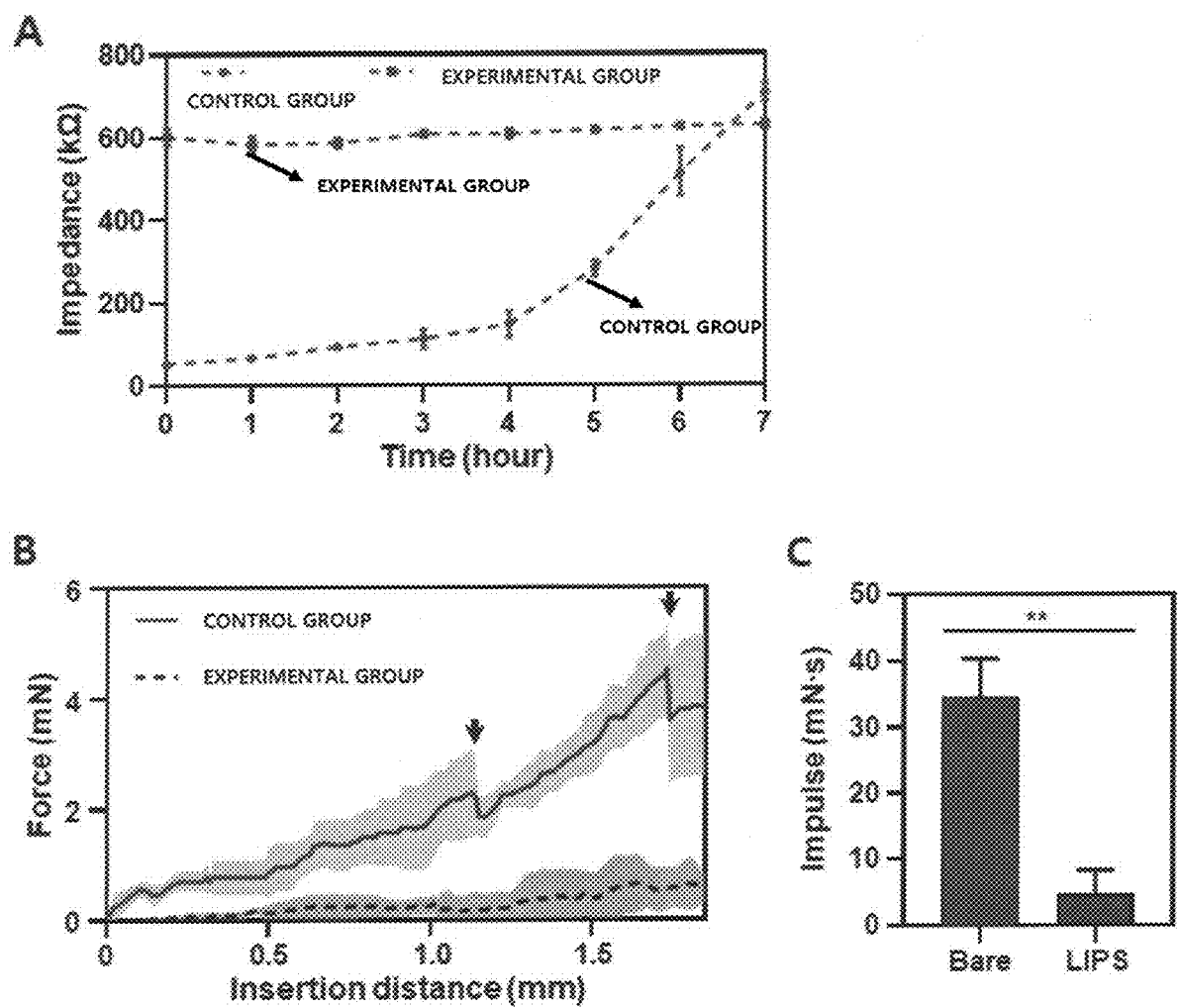
FIG. 6 shows results of an in vitro experiment to compare a bioadhesion force and a friction force which are respectively generated when a bare electrode (control group) and an LiPS electrode (the present invention) are inserted.

[Evaluation Example 4] In Vitro Experiment for Comparing Bioadhesion Force and Friction Force During Electrode Insertion First, a BARE electrode (control group) and an LiPS electrode (the present invention, experimental group) were immersed in blood, and then impedances that increase as blood proteins attached to a surface of the electrode were compared. Results of the comparison are shown in FIG. 6. It can be confirmed from FIG. 6, A that, in the case of the control group, the impedance increases with time, and this means that blood proteins gradually attached to the surface of the electrode in the control group over time.

Next, an agarose gel with similar properties to the brain was made, and friction between the gel and the electrode was measured while inserting each of the BARE electrode (control group) and the LiPS electrode (the present invention, experimental group) at a constant speed (0.1 mm/s). A frictional force according to an insertion distance is shown in FIG. 6, B. Further, the frictional force generated in this experiment was quantified as an impulse, and data thereof is shown in FIG. 6, C. It can be confirmed from FIGS. 6, B and 6, C that, in the case of the electrode in the control group, friction force according to the insertion was significantly greater.

Figure 7:
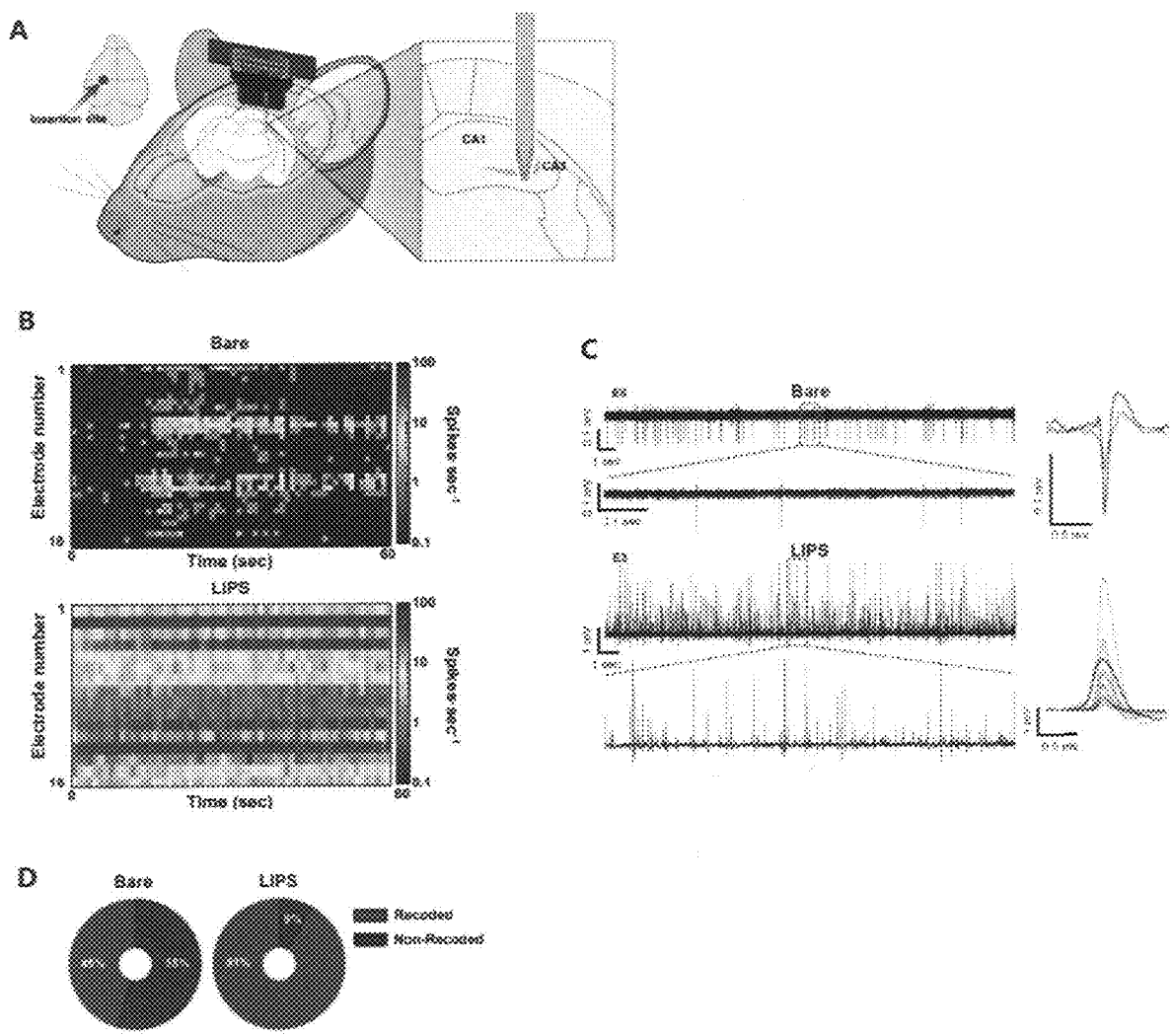
FIG. 7 shows results of an in vitro experiment comparing real-time electrode operability for 60 seconds after each of a bare electrode (control group) and an LiPS electrode (the present invention) is inserted into a mouse's brain.

[Evaluation Example 5] In Vitro Experiment for Comparing Acute Trauma Inhibitory Ability During Electrode Insertion Each of a bare electrode (control group) and an LiPS electrode (the present invention) was inserted into a mouse's brain, and then electrical signals were detected and recorded for 60 seconds to compare the electrode operability of the two electrodes, and an experimental schematic view and results of the comparison are shown in FIG. 7. It can be confirmed from FIG. 7 (FIGS. 7, B and C) that, when the electrode according to the present invention was used, electrical signals were well detected with higher quality. Further, it can be seen from FIG. 7, D that a recording rate (91%) of the electrical signals was significantly higher than a recording rate (45%) of those in the control group. This means that the electrode according to the present invention can suppress acute trauma well enough during insertion, and thus electrical signals from surrounding cells were well detected without being blocked by inflammation or the like caused by acute trauma.

Figure 8:
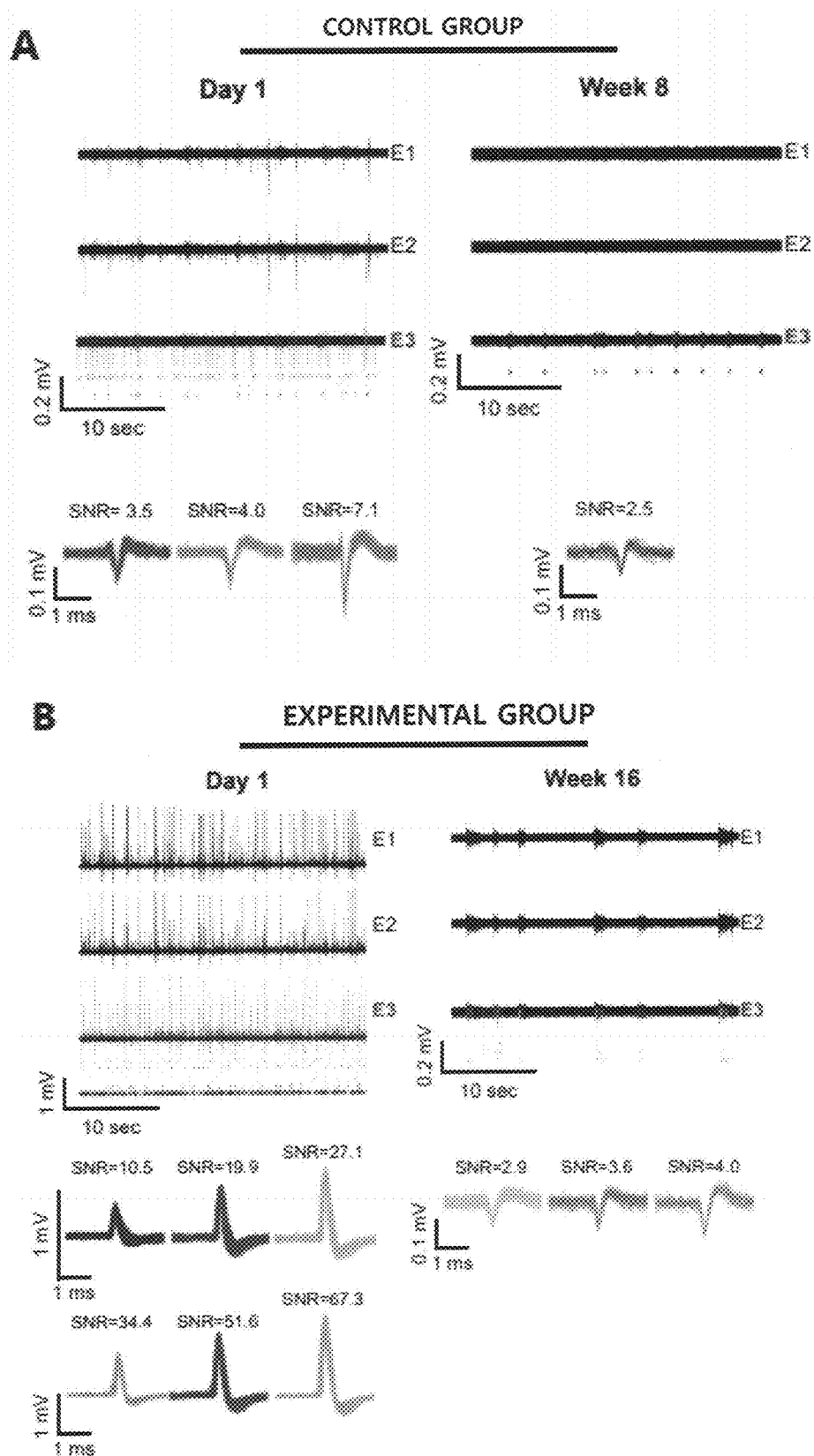
FIG. 8 shows results of an in vitro experiment comparing long-term electrode operability for 60 seconds after each of a bare electrode (control group) and an LiPS electrode (the present invention) is inserted into a mouse's brain.

[Evaluation Example 6] In Vitro Experiment for Comparing Immune Rejection Response Inhibitory Ability During Electrode Insertion Each of a bare electrode (control group) and an LiPS electrode (the present invention, experimental group) was inserted into a mouse's brain, and then the time taken until no electrical signal was detected was compared, and results of the comparison are shown in FIG. 8. It can be confirmed from FIG. 8 that, in the case of the control group, electrical signal detection was stopped after 8 weeks, whereas in the case of the experimental group according to the present invention, electrical signals could be detected up to 16 weeks. This means that an in vivo immune rejection response following long-term use could be suppressed in the experimental group according to the present invention.

Figure 9:
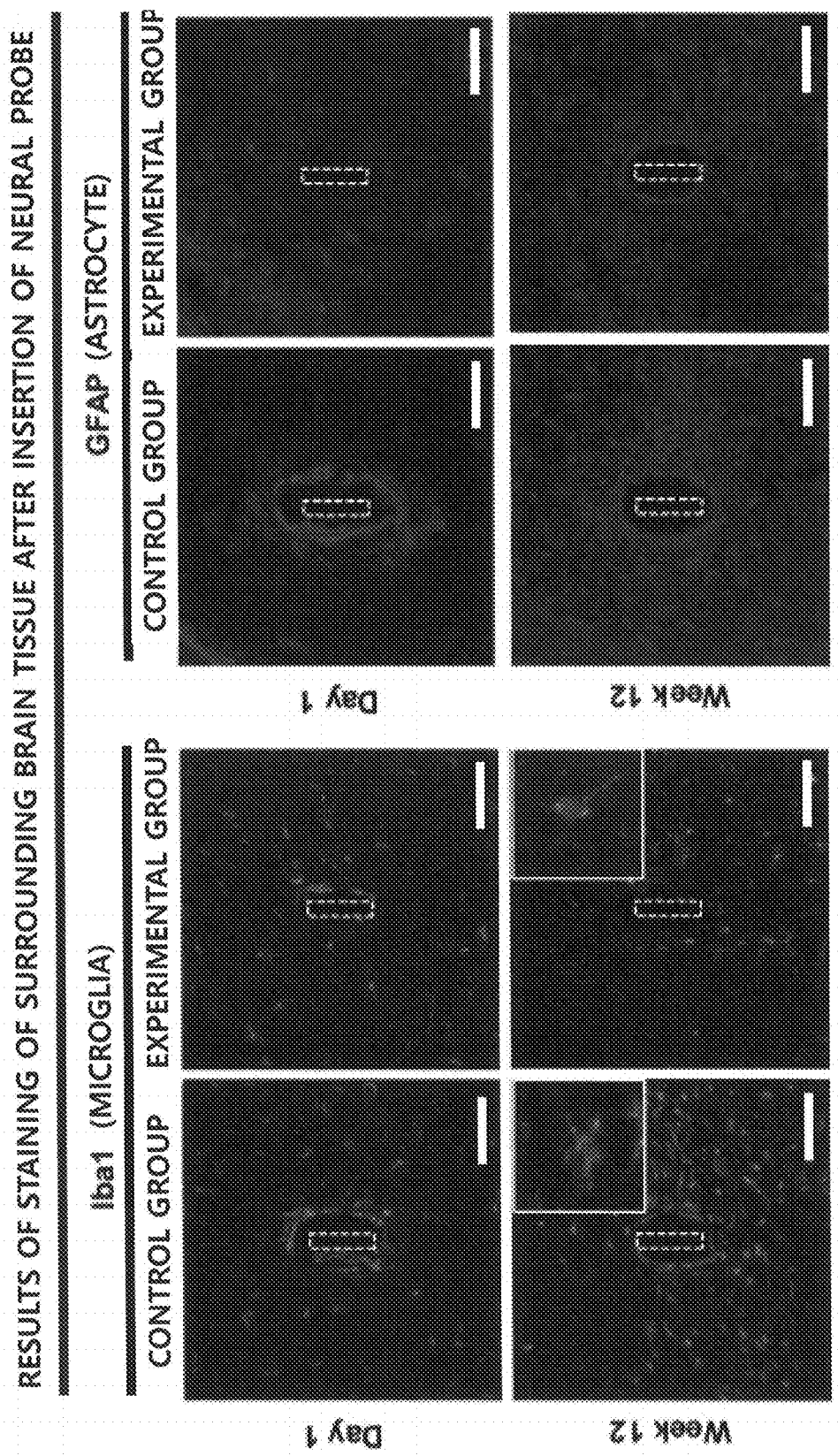
FIG. 9 shows results of an in vitro experiment comparing results of staining of surrounding brain tissue after each of a bare electrode (in control group) and an LiPS electrode (in the present invention) is inserted into a mouse's brain.

[Evaluation Example 7] In Vitro Experiment for Comparing Immune Rejection Response Inhibitory Ability During Electrode Insertion Each of a bare electrode (control group) and an LiPS electrode (the present invention, experimental group) was inserted into a mouse's brain, and then the mouse's brain was extracted on the 1st and 12th week and surrounding brain tissue cells (microglia, astrocytes) were stained, and results of the comparison are shown in FIG. 9. It can be confirmed from FIG. 9 that, in the case of the control group, many fluorescent dots appeared due to attachment and proliferation of immunocytes, whereas in the case of the experimental group according to the present invention, the number of these fluorescent dots was significantly smaller than that of the control group, which indicates that the immune rejection response was suppressed by using the electrode according to the present invention.

The in vivo insertable electrode according to the present invention can provide excellent electrical properties such as low impedance. Further, the electrode of the present invention can reduce friction with tissue that occurs when the electrode is inserted, suppress trauma and an immune rejection response that appears after insertion, and in the long term, prevent bioadhesion of in vivo cells, such as immunocytes, and other proteins. Accordingly, when the electrode of the present invention is used, it is possible to detect signals with high sensitivity throughout the entire period.

While the example embodiments of the present invention and their advantages have been described above in detail, it should be understood by those skilled in the art that various changes, substitutions and alterations may be made herein without departing from the scope of the present invention as defined by the following claims.

What is claimed is:

1. A method of manufacturing an in vivo insertable electrode, comprising:
   a step (a) of forming a platinum black layer on an electrically conductive layer;
   a step (b) of forming a self-assembled monolayer on the platinum black layer; and
   a step (c) of forming a lubricant layer on the self-assembled monolayer,
   wherein step (b) is performed by depositing a solution containing monomolecules for forming a self-assembled monolayer in a vacuum chamber under a pressure of 0.8 Torr to 1.2 Torr.

2. The method of claim 1, wherein step (a) is performed by electroplating in a solution containing a platinum precursor.

3. The method of claim 1, wherein step (b) further includes a step of performing surface treatment on the platinum black layer by performing plasma treatment on the platinum black layer with $N_2O$ or $O_2$,
   wherein the self-assembled monolayer is formed after the surface treatment is performed.

* * * * *